United States Patent
Cui et al.

(10) Patent No.: US 10,618,109 B2
(45) Date of Patent: Apr. 14, 2020

(54) HYBRID PRE-SINTERED PREFORM, GREEN PREFORM, AND PROCESS

(71) Applicant: GENERAL ELECTRIC COMPANY, Schenectady, NY (US)

(72) Inventors: Yan Cui, Greer, SC (US); Srikanth Chandrudu Kottilingam, Greenville, SC (US); Brian Lee Tollison, Honea Path, SC (US); Brian Leslie Henderson, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 236 days.

(21) Appl. No.: 15/670,520

(22) Filed: Aug. 7, 2017

(65) Prior Publication Data
US 2019/0039133 A1    Feb. 7, 2019

(51) Int. Cl.
*B22F 1/02*    (2006.01)
*B22F 3/10*    (2006.01)
*B23K 1/00*    (2006.01)
*C22C 19/05*    (2006.01)
*B22F 1/00*    (2006.01)
(Continued)

(52) U.S. Cl.
CPC .......... *B22F 1/025* (2013.01); *B22F 1/0003* (2013.01); *B22F 3/10* (2013.01); *B23K 1/00* (2013.01); *C22C 1/0433* (2013.01); *C22C 19/057* (2013.01); *B22F 1/0059* (2013.01); *B22F 7/08* (2013.01); *B22F 2301/15* (2013.01)

(58) Field of Classification Search
CPC .... B22F 1/02; B22F 1/025; B22F 3/10; B22F 2303/20; B22F 2303/25; B22F 2303/30
See application file for complete search history.

(56) References Cited

U.S. PATENT DOCUMENTS

| 6,051,277 A | 4/2000 | Claussen et al. |
| 9,056,443 B2 | 6/2015 | Schick et al. |
| 9,180,538 B2 | 11/2015 | Schick et al. |

(Continued)

FOREIGN PATENT DOCUMENTS

WO    2014/052754 A1    4/2014

OTHER PUBLICATIONS

International Search Report and Written Opinion issued in connection with corresponding PCT Application No. PCT/US2018/044953 dated Jan. 2, 2019.

*Primary Examiner* — Vanessa T. Luk
(74) *Attorney, Agent, or Firm* — McNees Wallace & Nurick LLC

(57) ABSTRACT

A process includes agitating at least one core of a core alloy together with a braze binder to form at least one coated core comprising the at least one core coated with a first layer of the braze binder. The process also includes agitating the at least one coated core together with a powder composition comprising a first metal powder of a first alloy and a second metal powder of a second alloy to form a green preform having a first powder composition layer of the first alloy and the second alloy. The process further includes sintering the green preform to form at least one hybrid pre-sintered preform. A green preform includes a core, a first layer of a braze binder coated on the core, and a powder composition coated on the first layer. A hybrid pre-sintered preform includes a core and a first layer sintered to the core.

13 Claims, 2 Drawing Sheets

(51) Int. Cl.
*C22C 1/04* (2006.01)
*B22F 7/08* (2006.01)

(56) References Cited

U.S. PATENT DOCUMENTS

| | | |
|---|---|---|
| 2011/0070119 A1 | 3/2011 | Belhadjhamida et al. |
| 2011/0243785 A1 | 10/2011 | Waag et al. |
| 2014/0154082 A1 | 6/2014 | Shinn et al. |
| 2014/0170433 A1* | 6/2014 | Schick ..................... B22F 7/08 428/548 |

* cited by examiner

HYBRID PRE-SINTERED PREFORM, GREEN PREFORM, AND PROCESS

FIELD OF THE INVENTION

The present embodiments are directed to green preforms, pre-sintered preforms, and processes of forming and using pre-sintered preforms. More specifically, the present embodiments are directed to hybrid green preforms with a core of a first alloy and a powder composition on the core, hybrid pre-sintered preforms with a core of a first alloy and a pre-sintered preform on the surface of the core, and processes of forming and using such preforms.

BACKGROUND OF THE INVENTION

Brazing is a useful process for joining two components or materials together. The brazing process may, however, be dependent upon specialty materials, such as a braze paste. The braze paste itself may have a short shelf life, and it may be difficult to control, for example, the consistency, quantity, and location of the braze paste, especially if access to the braze location is limited for the paste. If too little of an amount of braze paste is applied, the part may need to be reworked. If too great an amount of braze paste is applied, the braze paste may run to undesirable areas of the part. In addition, the use of a braze paste may result in inconsistencies in the brazing process, thereby resulting in a non-uniform component being manufactured or being repaired.

More specifically, turbine components are often manufactured with openings or passageways that, in certain situations, are no longer needed or are advantageously sealed or blocked after manufacture. Examples in a gas turbine system include a tip plug, a plenum hole, and a ball chute. These openings may be difficult to access for sealing or blocking. Conventionally, such openings are sealed or blocked by brazing either a pre-sintered preform ball or a metal ball of a superalloy, such as Hastelloy X, together with a braze paste. Pre-sintered preform vendors are limited in number, and obtaining pre-sintered preforms, especially customized pre-sintered preforms, from vendors may take time and be costly.

BRIEF DESCRIPTION OF THE INVENTION

In an embodiment, a process includes agitating at least one core of a core alloy together with a braze binder to form at least one coated core including the at least one core coated with a first layer of the braze binder. The process also includes agitating the at least one coated core together with a powder composition including a first metal powder of a first alloy and a second metal powder of a second alloy to form a green preform having a first powder composition layer of the first alloy and the second alloy. The process further includes sintering the green preform to form at least one hybrid pre-sintered preform.

In another embodiment, a green preform includes a core of a core alloy, a first layer of a braze binder coated on the core, and a powder composition including a first metal powder of a first alloy and a second metal powder of a second alloy coated on the first layer. The first alloy has a first melting point of at least about 2400° F., and the second alloy has a second melting point of below about 2350° F.

In yet another embodiment, a hybrid pre-sintered preform includes a core of a core alloy and a first layer sintered to the core. The first layer is a sintered powder composition including a first alloy from a first metal powder and a second alloy from a second metal powder. The first alloy has a first melting point of at least about 2400° F., and the second alloy has a second melting point of below about 2350° F.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
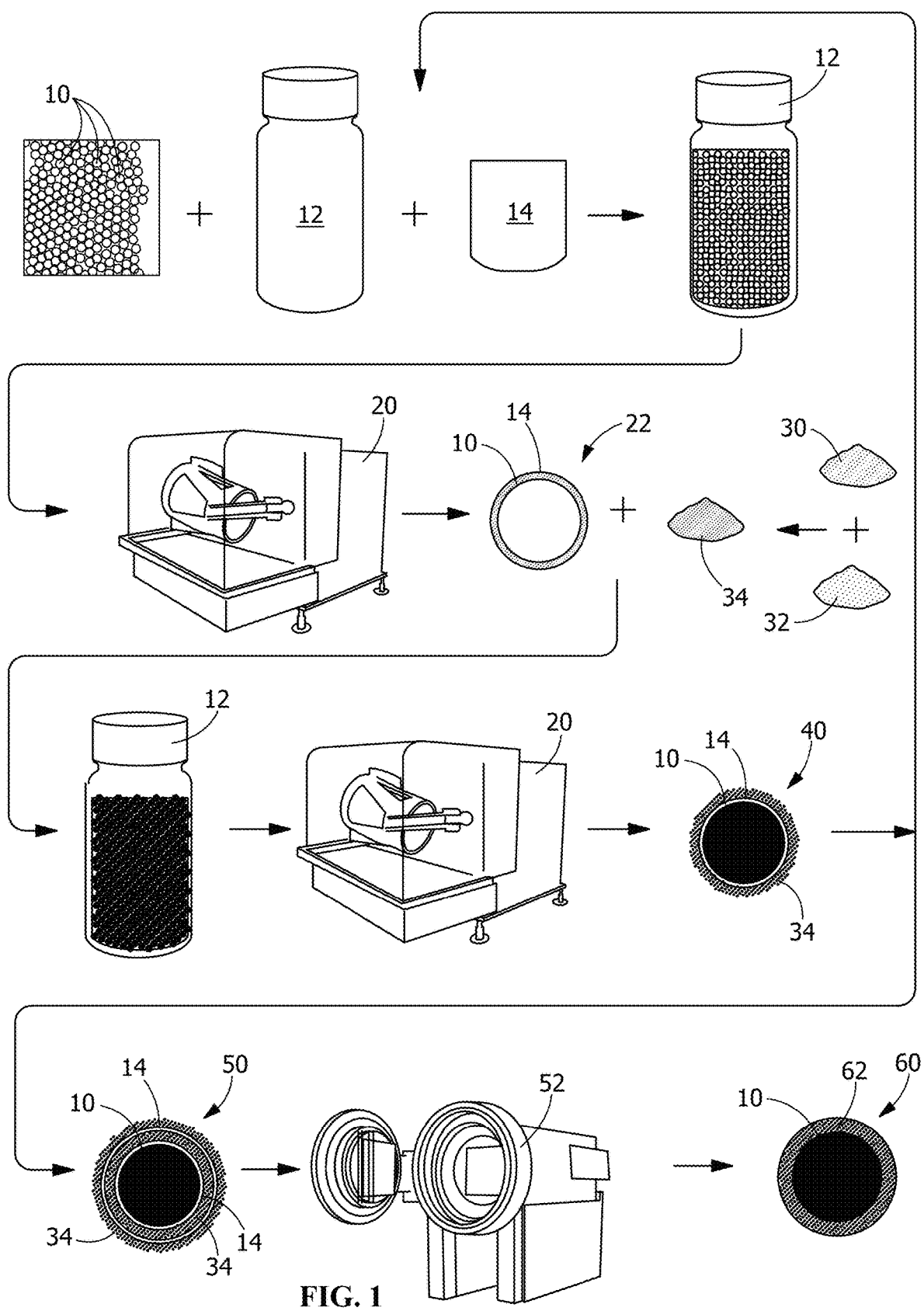
FIG. 1 schematically shows a process of forming a hybrid pre-sintered preform.

Provided is a hybrid green preform with a core of a first alloy and a powder composition on the core, a hybrid pre-sintered preform (PSP) with a core of a first alloy and a pre-sintered preform on the surface of the core, and processes of forming and using such preforms.

Embodiments of the present disclosure, for example, in comparison to concepts failing to include one or more of the features disclosed herein, provide hybrid PSPs, provide hybrid PSP balls, provide significantly lower cost hybrid PSPs, provide significantly lower cost hybrid PSP balls, provide easier control of the production of hybrid PSPs, provide easier control of the production of hybrid PSP balls, permit the production of a hybrid PSP on a shop floor, permit the production of a hybrid PSP ball on a shop floor, provide hybrid PSP balls for closure of turbine bucket ball chutes, provide hybrid PSP balls for sealing of tip plugs, provide hybrid PSP balls for blocking of plenum holes, or combinations thereof.

As used herein, "B93" refers to an alloy including a composition, by weight, of between about 13.7% and about 14.3% chromium (Cr), between about 9.0% and about 10.0% cobalt (Co), between about 4.6% and about 5.0% titanium (Ti), between about 4.5% and about 4.8% silicon (Si), between about 3.7% and about 4.3% molybdenum (Mo), between about 3.7% and about 4.0% tungsten (W), between about 2.8% and about 3.2% aluminum (Al), between about 0.50% and about 0.80% boron (B), between about 0.13% and about 0.19% carbon (C), incidental impurities, and a balance of nickel (Ni). B93 is commercially available, for example, from Oerlikon Metco (Pfaffikon, Switzerland).

As used herein, "BNi-2" refers to an alloy including a composition, by weight, of about 7% Cr, about 4.5% Si, about 3% B, about 3% iron (Fe), incidental impurities, and a balance of Ni. BNi-2 is commercially available, for example, from Lucas-Milhaupt, Inc. (Cudahy, Wis.).

As used herein, "BNi-3" refers to an alloy including a composition, by weight, of about 4.5% Si, about 3% B, incidental impurities, and a balance of Ni. BNi-3 is commercially available, for example, from Lucas-Milhaupt, Inc.

As used herein, "BNi-5" refers to an alloy including a composition, by weight, of about 19% Cr, about 10% Si, incidental impurities, and a balance of Ni. BNi-5 is commercially available, for example, from Lucas-Milhaupt, Inc.

As used herein, "BNi-6" refers to an alloy including a composition, by weight, of about 11% phosphorus (P), incidental impurities, and a balance of Ni. BNi-6 is commercially available, for example, from Lucas-Milhaupt, Inc.

As used herein, "BNi-7" refers to an alloy including a composition, by weight, of about 14% Cr, about 10% P, incidental impurities, and a balance of Ni. BNi-7 is commercially available, for example, from Lucas-Milhaupt, Inc.

As used herein, "BNi-9" refers to an alloy including a composition, by weight, of about 15% Cr, about 3% B, incidental impurities, and a balance of Ni. BNi-9 is commercially available, for example, from Lucas-Milhaupt, Inc.

As used herein, "BNi-10" refers to an alloy including a composition, by weight, of about 16% W, about 11.5% Cr, about 3.5% Si, about 3.5% Fe, about 2.5% B, about 0.5% C, incidental impurities, and a balance of Ni. BNi-10 is commercially available, for example, from AnHui Huazhong Welding Manufacturing Co., Ltd. (Hefei, China).

As used herein, "BRB" refers to an alloy including a composition, by weight, of between about 13.0% and about 14.0% Cr, between about 9.0% and about 10.0% Co, between about 3.5% and about 3.8% Al, between about 2.25% and about 2.75% B, incidental impurities, and a balance of Ni. BRB is commercially available, for example, from Oerlikon Metco.

As used herein, "D15" refers to an alloy including a composition, by weight, of between about 14.8% and about 15.8% Cr, between about 9.5% and about 11.0% Co, between about 3.2% and about 3.7% Al, between about 3.0% and about 3.8% tantalum (Ta), between about 2.1% and about 2.5% B, incidental impurities, and a balance of Ni. D15 is commercially available, for example, from Oerlikon Metco.

As used herein, "DF4B" refers to an alloy including a composition, by weight, of between about 13.0% and about 15% Cr, between about 9.0% and about 11.0% Co, between about 3.25 and about 3.75% Al, between about 2.25% and about 2.75% Ta, between about 2.5% and about 3.0% B, between about 0.01% and about 0.10% yttrium (Y), incidental impurities, and a balance of Ni. DF4B is commercially available, for example, from Oerlikon Metco.

As used herein, "GTD 111" refers to an alloy including a composition, by weight, of between about 13.70% and about 14.30% Cr, between about 9.0% and about 10.0% Co, between about 4.7% and about 5.1% Ti, between about 3.5% and about 4.1% W, between about 2.8% and about 3.2% Al, between about 2.4% and about 3.1% Ta, between about 1.4% and about 1.7% Mo, about 0.35% Fe, about 0.3% Si, about 0.15% niobium (Nb), between about 0.08% and about 0.12% C, about 0.1% manganese (Mn), about 0.1% copper (Cu), about 0.04% zirconium (Zr), between about 0.005% and about 0.020% B, about 0.015% P, about 0.005% sulfur (S), incidental impurities, and a balance of Ni.

As used herein, "GTD 444" refers to an alloy including a composition, by weight, of about 9.75% Cr, about 7.5% Co, about 4.2% Al, about 3.5% Ti, about 4.8% Ta, about 6% W, about 1.5% Mo, up to about 0.5% Nb, up to about 0.2% Fe, up to about 0.2% Si, up to about 0.15% hafnium (Hf), up to about 0.08% C, up to about 0.009% Zr, up to about 0.009% B, incidental impurities, and a balance of Ni.

As used herein, "Hastelloy X" refers to an alloy including a composition, by weight, of between about 8% and about 10% Mo, between about 20.5% and about 23% Cr, between about 17% and about 20% Fe, between about 0.2% and about 1% W, between about 0.5% and about 2.5% Co, between about 0.05% and about 0.15% C, up to about 1% Si, up to about 1% Mn, up to about 0.01% B, up to about 0.04% P, up to about 0.03% S, incidental impurities, and a balance of Ni.

As used herein, "HAYNES 188" refers to an alloy including a composition, by weight, of between about 21% and about 23% Cr, between about 20% and about 24% Ni, between about 13% and about 15% W, up to about 3% Fe, up to about 1.25% Mn, between about 0.2% and about 0.5% Si, between about 0.05% and about 0.15% C, between about 0.03% and about 0.12% lanthanum (La), up to about 0.02% P, up to about 0.015% B, up to about 0.015% S, incidental impurities, and a balance of Co.

As used herein, "HAYNES 230" refers to an alloy including a composition, by weight, of about 22% Cr, about 2% Mo, about 0.5% Mn, about 0.4% Si, about 14% W, about 0.3% Al, about 0.1% C, about 0.02% La, incidental impurities, and a balance of Ni.

As used herein, "INCONEL 738" refers to an alloy including a composition, by weight, of between about 15.7% and about 16.3% Cr, about 8.0% to about 9.0% Co, between about 3.2% and about 3.7% Ti, between about 3.2% and about 3.7% Al, between about 2.4% and about 2.8% W, between about 1.5% and about 2.0% Ta, between about 1.5% and about 2.0% Mo, between about 0.6% and about 1.1% Nb, up to about 0.5% Fe, up to about 0.3% Si, up to about 0.2% Mn, between about 0.15% and about 0.20% C, between about 0.05% and about 0.15% Zr, up to about 0.015% S, between about 0.005% and about 0.015% B, incidental impurities, and a balance of Ni.

As used herein, "L605" refers to an alloy including a composition, by weight, of between about 19% and about 21% Cr, between about 14% and about 16% W, between about 9% and about 11% Ni, up to about 3% Fe, between about 1% and about 2% Mn, between about 0.05% and about 0.15% C, up to about 0.4% Si, up to about 0.04% P, up to about 0.03% S, incidental impurities, and a balance of Co.

As used herein, "MarM247" refers to an alloy including a composition, by weight, of between about 9.3% and about 9.7% W, between about 9.0% and about 9.5% Co, between about 8.0% and about 8.5% Cr, between about 5.4% and about 5.7% Al, optionally about 3.2% Ta, optionally about 1.4% Hf, up to about 0.25% Si, up to about 0.1% Mn, between about 0.06% and about 0.09% C, incidental impurities, and a balance of Ni.

As used herein, "MarM509" refers to an alloy including a composition, by weight, of between about 22.5% and about 24.25% Cr, between about 9% and about 11% Ni, between about 6.5% and about 7.5% W, between about 3% and about 4% Ta, up to about 0.3% Ti (for example, between about 0.15% and about 0.3% Ti), up to about 0.65% C (for example, between about 0.55% and about 0.65% C), up to about 0.55% Zr (for example, between about 0.45% and about 0.55% Zr), incidental impurities, and a balance of Co.

As used herein, "MarM509B" refers to an alloy including a composition, by weight, of between about 22.00% and about 24.75% Cr, between about 9.0% and about 11.0% Ni, between about 6.5% and about 7.6% W, between about 3.0% and about 4.0% Ta, between about 2.6% and about 3.16% B, between about 0.55% and about 0.64% C, between about 0.30% and about 0.60% Zr, between about 0.15% and about 0.30% Ti, up to about 1.30% Fe, up to about 0.40% Si, up to about 0.10% Mn, up to about 0.02% S, incidental impurities, and a balance of Co. MM509B is commercially available, for example, from WESGO Ceramics.

As used herein, "René 108" refers to an alloy including a composition, by weight, of between about 9% and about 10% Co, between about 9.3% and about 9.7% W, between about 8.0% and about 8.7% Cr, between about 5.25% and about 5.75% Al, between about 2.8% and about 3.3% Ta, between about 1.3% and about 1.7% Hf, up to about 0.9%

Ti (for example, between about 0.6% and about 0.9% Ti), up to about 0.6% Mo (for example, between about 0.4% and about 0.6% Mo), up to about 0.2% Fe, up to about 0.12% Si, up to about 0.1% Mn, up to about 0.1% Cu, up to about 0.1% C (for example, between about 0.07% and about 0.1% C), up to about 0.1% Nb, up to about 0.02% Zr (for example, between about 0.005% and about 0.02% Zr), up to about 0.02% B (for example, between about 0.01% and about 0.02% B), up to about 0.01% P, up to about 0.004% S, incidental impurities, and a balance of Ni.

As used herein, "René 142" refers to an alloy including a composition, by weight, of about 12% Co, about 6.8% Cr, about 6.4% Ta, about 6.1% Al, about 4.9% W, about 2.8% rhenium (Re), about 1.5% Mo, about 1.5% Hf, about 0.12% C, about 0.02% Zr, about 0.015% B, incidental impurities, and a balance of Ni.

As used herein, "René 195" refers to an alloy including a composition, by weight, of about 7.6% Cr, about 3.1% Co, about 7.8% Al, about 5.5% Ta, about 0.1% Mo, about 3.9% W, about 1.7% Re, about 0.15% Hf, incidental impurities, and a balance of Ni.

As used herein, "René N2" refers to an alloy including a composition, by weight, of about 13% Cr, about 7.5% Co, about 6.6% Al, about 5% Ta, about 3.8% W, about 1.6% Re, about 0.15% Hf, incidental impurities, and a balance of Ni.

As used herein, "T800" refers to an alloy including a composition, by weight, of between about 27.0% and about 30.0% Mo, between about 16.5% and about 18.5% Cr, between about 3.0% and 3.8% Si, up to about 1.5% Fe, up to about 1.5% Ni, up to about 0.15% oxygen (O), up to about 0.08% C, up to about 0.03% P, up to about 0.03% S, incidental impurities, and a balance of Co. T800 is produced, for example, by Deloro Stellite Inc. and is commercially available, for example, from WESGO Ceramics.

Referring to FIG. 1, a process includes placing cores 10 of a core alloy in a container 12 with a braze binder 14. The cores 10 in FIG. 1 are spherical. The container 12 in FIG. 1 is a plastic bottle with a cap. The container 12 is placed in a mixer 20, which shakes the container 12 to agitate the cores 10 and the braze binder 14 to form coated cores 22 of the cores 10 each coated with a layer of the braze binder 14.

Still referring to FIG. 1, a first powder 30 of a first alloy is mixed with a second powder 32 of a second alloy to form a powder composition 34. The first alloy and the second alloy have different melting temperatures. The powder composition 34 and the coated cores 22 are placed in a container 12. The container 12 for the coated cores 22 and the powder composition 34 in FIG. 1 is a plastic bottle with a cap similar to or identical to the container 12 for the cores 10 and the braze binder 14, but preferably not the same container 12. The container 12 is placed in a mixer 20, which shakes the container 12 to agitate the coated core 22 and the powder composition 34 to form green preforms 40 of the cores 10, each coated with a layer of the braze binder 14 and the powder composition 34 in an un-sintered state stuck to the layer of braze binder 14. The same mixer 20 or a different mixer 20 may be used for the two agitations.

Still referring to FIG. 1, the alternating steps of applying a layer of braze binder 14 and applying a powder composition 34 may be repeated any number of times until a sufficient amount of powder composition 34 has been applied to the cores 10 to form a powder-coated green preform 50. In FIG. 1, the powder-coated green preform 50 has two layers of braze binder 14 and two layers of powder composition 34, but the powder-coated green preform 50 may alternatively be the same as the green preform 40 or may have additional powder composition 34 from additional layers. The powder-coated green preform 50 is then sintered in a sintering furnace 52 to form a hybrid pre-sintered preform 60 of the core 10 coated with a sintered powder composition 62. In some embodiments, the sintering furnace 52 is a vacuum furnace. In some embodiments, the sintering occurs in a vacuum furnace. In some embodiments, the temperature for the sintering is in the range of about 1150° C. (about 2100° F.) to about 1290° C. (about 2350° F.). The braze binder 14 is burned off during the sintering.

In some embodiments, the hybrid pre-sintered preform 60 is ready for brazing directly after the sintering without any additional processing steps. In other embodiments, the hybrid-pre-sintered preform 60 may be ground to alter the surface texture or geometry after sintering but prior to brazing or use in production. In some embodiments, the grinding produces a smooth surface geometry on the outer surface of the hybrid pre-sintered preform 60. In some embodiments, the grinding alternatively or additionally produces round geometry on the outer surface of the hybrid pre-sintered preform 60.

Figure 2:
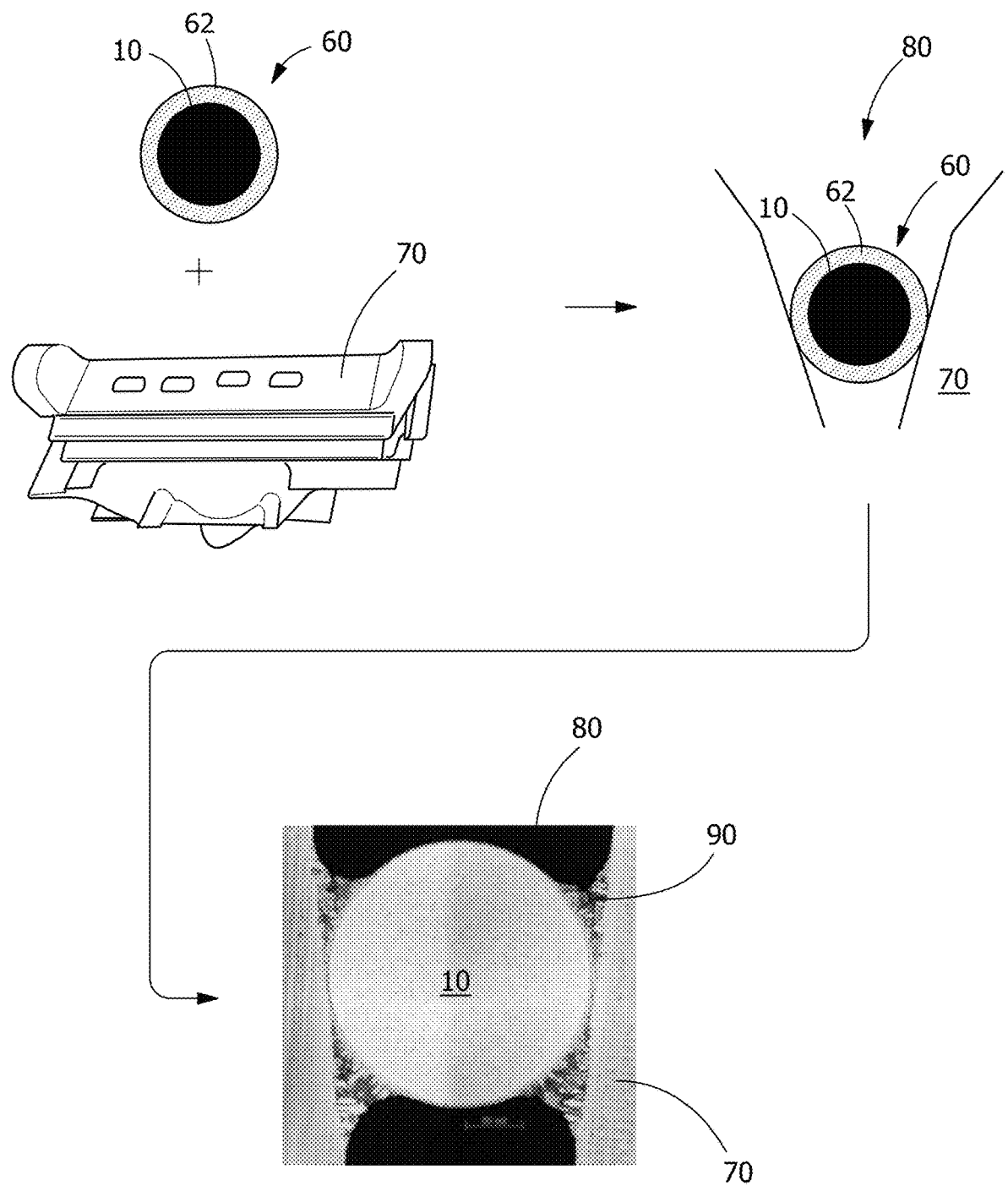
FIG. 2 schematically shows a process of brazing a hybrid pre-sintered preform.

Referring to FIG. 2, a process includes placing a hybrid pre-sintered preform 60 including a core 10 and a sintered powder composition 62 around the core 10 in a passageway 80 of a component 70. The hybrid pre-sintered preform 60 is then brazed to the component 70 in the passageway 80 of the component. In some embodiments, the temperature for the brazing is in the range of about 1150° C. (about 2100° F.) to about 1290° C. (about 2350° F.). In some embodiments, the time for the brazing is in the range of about 10 minutes to about 30 minutes. The core 10, the braze joint 90, the component 70, and the passageway 80 are all visible in the last image in FIG. 2, with the core 10 having a diameter of about 5.7 mm (about 0.23 in.).

The core 10 may have a maximum length dimension (diameter, in the case of a spherical geometry) in the range of about 2.5 mm (about 0.1 in.) to about 19.1 mm (about 0.75 in.), alternatively about 12.7 mm (about 0.5 in.) to about 19.1 mm (about 0.75 in.), alternatively about 2.5 mm (about 0.1 in.) to about 12.7 mm (about 0.5 in.), alternatively about 3.8 mm (about 0.15 in.) to about 10.2 mm (about 0.4 in.), alternatively about 5.1 mm (about 0.2 in.) to about 7.6 mm (about 0.3 in.), alternatively about 5.1 mm (about 0.2 in.) to about 6.4 mm (about 0.25 in.), or any value, range, or sub-range therebetween.

In some embodiments, the core alloy of the core 10 is a superalloy. The core alloy may include one or more refractory alloys, superalloys, nickel-based superalloys, cobalt-based superalloys, iron-based superalloys, titanium-aluminum superalloys, iron-based alloys, steel alloys, stainless steel alloys, cobalt-based alloys, nickel-based alloys, titanium-based alloys, Hastelloy X, HAYNES 188, HAYNES 230, or combinations thereof. In some embodiments, the core alloy is not a pre-sintered preform.

The braze binder 14 may be of any binder composition that forms a coating layer on a core 10, maintains a powder composition 34 on the core 10 prior to brazing, and burns off during a brazing step. The braze binder 14 preferably includes a binder component in a solvent. In some embodiments, the braze binder 14 has the consistency of a gel. In some embodiments, the braze binder 14 is a binder gel. In some embodiments, the binder gel is a conventional binder gel. In some embodiments, the braze binder does not include any braze metals or alloys.

In some embodiments, the powder composition 34 includes a first alloy and a second alloy intermixed with one another as distinct phases. The first alloy has a higher melting temperature than the second alloy. The first alloy is a high melt alloy powder and may include a first melting point of at least about 1320° C. (about 2400° F.), and the second alloy is a low melt alloy powder and may include a second melting point of below about 1290° C. (about 2350° F.).

The first alloy may include one or more refractory alloys, superalloys, nickel-based superalloys, cobalt-based superalloys, iron-based superalloys, titanium-aluminum superalloys, iron-based alloys, steel alloys, stainless steel alloys, cobalt-based alloys, nickel-based alloys, titanium-based alloys, T800, GTD 111, GTD 444, HAYNES 188, HAYNES 230, INCONEL 738, L605, MarM247, MarM509, René 108, René 142, René 195, René N2, or combinations thereof.

The second alloy may include one or more braze alloys, iron-based alloys, steel alloys, stainless steel alloys, cobalt-based alloys, nickel-based alloys, titanium-based alloys, DF4B, D15, MarM509B, B93, BNi-2, BNi-3, BNi-5, BNi-6, BNi-7, BNi-9, BNi-10, BRB, or combinations thereof.

In some embodiments, the powder composition 34 further includes one or more ceramic additives, such as, but not limited to, aluminum oxide, silicon carbide, tungsten carbide, titanium nitride, titanium carbonitride, titanium carbide, or combinations thereof.

In some embodiments, the powder composition 34 includes a mixture of about 90% by weight of the first alloy and about 10% by weight of the second alloy, alternatively about 80% by weight of the first alloy and about 20% by weight of the second alloy, alternatively about 70% by weight of the first alloy and about 30% by weight of the second alloy, alternatively about 60% by weight of the first alloy and about 40% by weight of the second alloy, alternatively about 50% by weight of the first alloy and about 50% by weight of the second alloy, alternatively about 45% by weight of the first alloy and about 55% by weight of the second alloy, or any value, range, or sub-range therebetween. In some embodiments, the first alloy is MarM247. In some embodiments, the second alloy is DF4B.

In some embodiments, each layer of braze binder 14 has the same composition as every other layer of braze binder 14. In some embodiments, each coating of powder composition 34 has the same composition as every other coating of powder composition 34. In some embodiments, the composition of at least one of the coatings of powder composition 34 is different from the composition of at least one other coating of powder composition 34. In some embodiments, the first alloy or the second alloy is different in at least one of the coatings. In some embodiments, the first alloy is the same in all of the coatings and the second alloy is the same in all of the coatings, but the relative amounts of the first and second alloy vary. In some embodiments, the coatings provide a gradient in the relative amounts of the first and second alloy in the coatings from the innermost coating to the outermost coating. In some embodiments, the ratio of the first alloy to the second alloy decreases from the innermost coating to the outermost coating.

Although the core 10 is shown as spherical in the drawings, the core 10 may have any geometry conducive to being placed in a passageway and sealing an opening, including, but not limited to, spherical, ovoid, cylindrical, conical, cubical, rectangular, or tapered.

The container 12 may have any size and shape and may be made of any material that is able to contain the cores 10 and either the braze binder 14 or the powder composition 34 during an agitating step such that a uniform or substantially uniform coating of the braze binder 14 or the powder composition 34 is applied to the outer surface of the cores 10.

The ratio and amounts of the braze binder 14 to the cores 10 are preferably selected to provide coated cores 22 with a uniform or substantially uniform layer of the braze binder 14 on the cores 10 by the first/odd-numbered agitations.

Similarly, the ratio and amounts of powder composition 34 to the coated cores 22 are preferably selected to provide green preforms 40 with a uniform or substantially uniform coating of the powder composition 34 on the green preforms 40 by the second/even-numbered agitations.

The agitation may occur manually but is preferably automated. The agitation may include any shaking movement of the container 12 that produces mixing of the cores 10 with the applied braze binder 14 or powder composition 34. In some embodiments, the agitating occurs in a three-dimensional shaker-mixer. In some embodiments, the shaker-mixer is a TURBULA® shaker-mixer (Willy A. Bachofen AG, Basel, Switzerland). In some embodiments, the agitating occurs on a two-dimensional shaker table.

After sintering, the hybrid pre-sintered preform 60 may be used directly in a brazing processor or may be ground prior to brazing or use in production.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A process comprising:
   agitating at least one core of a core alloy together with a braze binder to form at least one coated core comprising the at least one core coated with a first layer of the braze binder;
   agitating the at least one coated core together with a powder composition comprising a first metal powder of a first alloy and a second metal powder of a second alloy to form a green preform having a first powder composition layer of the first alloy and the second alloy; and
   sintering the green preform to form at least one hybrid pre-sintered preform (PSP).

2. The process of claim 1, wherein the first alloy has a first melting point of at least about 2400° F. and the second alloy has a second melting point of below about 2350° F.

3. The process of claim 1, wherein the braze binder is a braze binder gel.

4. The process of claim 1 further comprising agitating the green preform together with the braze binder to form a braze binder-coated green preform and agitating the braze binder-coated green preform together with the first metal powder and the second metal powder to form a powder-coated green preform, wherein the sintering is of the powder-coated green preform.

5. The process of claim 1, wherein the at least one core is spherical.

6. The process of claim 1, wherein the core alloy includes a composition, by weight, of between about 8% and about 10% molybdenum, between about 20.5% and about 23% chromium, between about 17% and about 20% iron, between about 0.2% and about 1% tungsten, between about 0.5% and about 2.5% cobalt, between about 0.05% and about 0.15% carbon, up to about 1% silicon, up to about 1% manganese, up to about 0.01% boron, up to about 0.04% phosphorus, up to about 0.03 sulfur, incidental impurities, and a balance of nickel.

7. The process of claim 1, wherein the first alloy includes a composition, by weight, of between about 9.3% and about 9.7% tungsten, between about 9.0% and about 9.5% cobalt, between about 8.0% and about 8.5% chromium, between about 5.4% and about 5.7% aluminum, about 3.2% tantalum, about 1.4% hafnium, up to about 0.25% silicon, up to about 0.1% manganese, between about 0.06% and about 0.09% carbon, incidental impurities, and a balance of nickel.

8. The process of claim 1, wherein the second alloy includes a composition, by weight, of about 14% chromium, about 10% cobalt, about 3.5% aluminum, about 2.5% tantalum, about 2.75% boron, about 0.05% yttrium, incidental impurities, and a balance of nickel.

9. The process of claim 1, wherein the first metal powder and the second metal powder are present in the powder composition in a ratio, by weight, in the range of 90:10 to 45:55.

10. The process of claim 1 further comprising brazing one of the at least one hybrid PSP in a passageway to seal the passageway.

11. The process of claim 10, wherein the passageway is a bucket ball chute of a gas turbine bucket.

12. The process of claim 1, wherein the agitating at least one core of a core alloy together with a braze binder occurs with the at least one core and the braze binder in a plastic container.

13. The process of claim 1, wherein the agitating at least one core of a core alloy together with a braze binder and the agitating the at least one coated core together with a powder composition comprising of a first metal powder of a first alloy and a second metal powder of a second alloy are performed by a three-dimensional shaker-mixer.

* * * * *